Patented Dec. 23, 1930

1,785,777

UNITED STATES PATENT OFFICE

CHARLES J. KINZIE, OF NIAGARA FALLS, NEW YORK, ASSIGNOR TO THE TITANIUM ALLOY MANUFACTURING COMPANY, OF NEW YORK, N. Y., A CORPORATION OF MAINE

PROCESS FOR PRODUCING VITREOUS ENAMELS

No Drawing. Application filed July 31, 1928. Serial No. 296,637.

My invention relates more particularly to improved methods in the preparation of enamel slips for use in vitreous enameling and glazing, especially those slips compounded from acid resisting glass.

The objects of my invention are, among other things, to produce enamel slips of such composition in which the finely ground glass particles will be uniformly floated throughout the mass without any undesirable settling of the glass particles, and at the same time will impart the required consistency to such slip for the enamel coatings.

In the process of vitreous enameling and glazing by the wet process in which the enamel or glaze is milled with water to a degree of fineness as required, the usual practice is to add enamelers' clay at the ball or pebble mill in which the grinding is done. This clay, if of suitable plastic properties, keeps the glass particles afloat during the handling of the enamel slip. It is essential that these particles of glass once miled to requisite degree of fineness be kept in suspension in the water; otherwise there would occur in the vessel containing the slip a zone of dense glass particles and another layer or zone rich in opacifier and clay. Even if this slip once settled were mixed to a uniform slip and applied to ware, a settling would occur with the glass particles on the bottom and the clay and opacifier at the top. The result of firing such a coating on metal would be the production of a dull surfaced enameled article.

In the case of ordinary enamel compositions, usualy no difficulty is experienced in keeping the glass particles afloat by means of the clay, and the usual enamel slip can be left standing for weeks without settling out of glass particles.

In the recent production of vitreous enamel coatings that would resist the action of acids, such as contained in lemon juice for instance, a distinctly different type of enamel glass has been developed.

These acid resisting enamels and glasses when treated in the milling by the practice followed for ordinary enamels will settle out, the clay having little or no effect alone in keeping the glass particles afloat. The difficulties encountered in attempting to keep such glasses afloat in the slip have been such as to interefere materially with their successful application as enamel coatings. The glass particles settle into a hard dense mass, which it is next to impossible to dislodge.

In the production of acid resisting enamels and glazes, the glass for vitreous enameling is low in, or entirely free from, alumina and high in silicia with approximately 50% $SiO_2$ in the glass.

I have discovered that such glasses when milled with water impart a decidedly alkaline character to the water with the result that such slip is quite slippery and the clay alone will not float the glass particles. The partial or complete neutralization of this water dissolved alkaline substance by acids will result in partially setting up the slip, and is accompanied by a partial flotation of the enamel. However I have determined that the neutralization of the alkali in this manner is not sufficient to impart the necessary properties to the slip to render same properly workable in enameling of this character where acid resisting qualities are desired.

I have also discovered that the addition of any salt which in contact with the alkaline liquor would be decomposed would result in neutralizing a part or all of the alkalinity of the mill liquor, and also yield, due to this reaction, a permanent hydrate precipitate that would impart the required consistency to the enamel slip. The salts used are those of the metallic elements designated in Group IV, Subgroup A. of Mendelejeff's classification of the elements, such elements having a molecular weight below 100, to-wit: titanium and zirconium. The hydrate precipitate in the nature of a flocculent substance, such as for example titanium or zirconium hydrate, will occupy a large volume in the slip and will not cause the finished enamel surface to be affected by acids such as those contained in lemon juice.

Aluminum sulphate should not be used as aluminum is detrimental to the desired acid resistance of the enamel, while iron sulphates would be objectionable because of contributed color. Magnesium sulphate would be decomposed with precipitation of magnesium hydrate: However, magnesium hydrate is easily soluble in alkalies and therefore does not give a permanent effect during the use of the enamel slip.

In order that the nature of my discoveries may be understood in which any salt capable of being decomposed by the alkaline mill liquor may be used so that the resulting partial or complete neutralization of this liquor upon decomposition will yield a precipitate insoluble in the mill liquor, the following illustrative examples will be set forth to show how my improved methods may be successfully practiced.

*Example A.*—I have found that titanium sulphate is very effective in obtaining the desired reactions whereby the glass particles may be uniformly floated in the enamel slip while imparting the necessary consistency thereto. Having prepared the acid resisting or other enamel or glass which does not respond to the use of clay as a flooding agent, the glass is placed in a ball or pebble mill using the following charge:

|  | Parts by weight |
|---|---|
| Acid resisting glass | 100. |
| English pipe clay | 4. |
| Titanium sulphate crystals | 0.60 |
| Water (approximately) | 40. |
| Total | 144.60 |

The titanium sulphate crystals used having the empirical formula of $Ti(SO_4)_2 - 9H_2O$ were of the following composition:

|  | Per cent |
|---|---|
| Ti | = 12. |
| $SO_4$ | = 47.7 |
| $H_2O$ | = 40.3 |
|  | 100.00 |

This charge as mixed was milled until the glass had been reduced to desired fineness, the degree of which will vary under different conditions; but usually this fineness should be such that more than 90% of the glass will pass through a 200 mesh sieve. The treatment of the enamel slip after such milling need not be further described. The sulphate reacts with the charge to form a permanent titanium hydrate precipitate which not only neutralizes the alkalinity of the mill liquor, but gives the required consistency to the enamel slip since such hydrated compound is insoluble in contact with the neutral or partly alkaline mill liquor.

A titanium sulphate solution may also be used which could be added at the mill, or after the slip is taken from the mill. However the titanium sulphate crystals should be used only when the additions of salt are made at the mill, but never after the slip has been removed therefrom. If additional salt is necessary after the slip is taken from the mill, this requirement should be met by adding same in the form of a titanium sulphate solution.

*Example B.*—In using zirconium sulphate, I discovered that no clay is required to prevent the undesirable settling of the glass particles of the acid resisting glass.

Slips are made of the following charge:

|  | Parts by weight |
|---|---|
| Acid resisting glass | 100. |
| Zirconium sulphate | 0.50 |
| Water (approximately) | 40. |
| Total | 140.50 |

The charge was milled to glass particle fineness of nearly all 200 mesh. Such slip was used in coating iron articles, but the dried film of enamel was somewhat easily dislodged during handling. However when the pieces were enameled and burned, it was found that the use of zirconium sulphate as described had in no wise decreased the resistance of the enamel to acids. To impart the necessarry cohesive strength during handling in transferring the ware from the drier to the furnace, a small amount of clay was added to give such strength to the dried coating. Most clays cause the final enamel to be slightly affected by lemon juice, but this result is not permanent where zirconium sulphate was used and did not cause any loss in the enamel lustre.

According to my invention, I am not restricted to the use of titanium or zirconium sulphates alone, but any salt may be added which reacts with the alkaline mill liquor formed for vitreous acid resisting enamels and glazes, so as not only to neutralize a part or all of the alkalinity of the mill liquor, but also to produce a hydrate precipitate of the element introduced in salt form, such hydrated compound being insoluble in contact with such mill liquor, whereby homogeneous acid resisting enamel slips may be made without any settling out of the glass particles contained therein.

I claim as my invention:—

1. In the preparation of a slip for vitreous enamels and glazes from mill liquor containing alkaline substances, the step which consists in treating said liquor with a salt of one of the metallic elements in Group IV, Subgroup A. of Mendelejeff's classification having a molecular weight below 100 to neutralize said alkaline substances and produce a hydrate precipitate of the element introduced as said salt.

2. In the preparation of a slip for vitreous enamels and glazes from mill liquor containing alkaline substances, the step which consists in treating said liquor with a salt of one of the metallic elements in Group IV, subgroup A. of Mendelejeff's classification having a molecular weight below 100 to partially neutralize said alkaline substances and produce a hydrate precipitate of the element introduced as said salt.

3. In the preparation of a slip for vitreous enamels and glazes from acid resisting glass mill liquor containing approximately 50% silica besides alkaline substances, the step which consists in treating said liquor with a salt of one of the metallic elements in Group IV, Subgroup A. of Mendelejeff's classification having a molecular weight below 100 to neutralize said alkaline substances and produce a hydrate precipitate of the element introduced as said salt.

4. In the preparation of a slip for vitreous enamels and glazes from mill liquor containing finely-divided glass particles, the step which consists in adding thereto a salt of one of the metallic elements in Group IV, Subgroup A. of Mendelejeff's classification having a molecular weight below 100 which will react with said liquor whereby said glass particles are held in substantially uniform suspension therein.

5. In the preparation of a slip for vitreous enamels and glazes from acid resisting glass mill liquor containing finely-divided glass particles, the step which consists in adding thereto a salt of one of the metallic elements in Group IV, Subgroup A. of Mendelejeff's classification having a molecular weight below 100 which will react with said liquor whereby said glass particles are held in substantially uniform suspension therein.

6. In the preparation of a slip for vitreous enamels and glazes from mill liquor containing alkaline substances, the step which consists in adding thereto titanium sulphate to neutralize said alkaline substances and produce therein a precipitation of titanium hydrate.

7. In the preparation of a slip for vitreous enamels and glazes from acid resisting glass mill liquor containing approximately 50% silica besides alkaline substances, the step which consists in adding thereto titanium sulphate to neutralize said alkaline substances and produce therein a precipitation of titanium hydrate.

8. In the preparation of an enamel slip for use in vitreous enameling and glazing, the step which consists in adding titanium sulphate crystals to the charge during milling.

9. In the preparation of an enamel slip for use in vitreous enameling and glazing, the step which consists in adding a titanium sulphate solution to the charge at the mill.

10. In the preparation of an enamel slip for use in vitreous enameling and glazing, the step which consists in adding a titanium sulphate solution to the slip after the slip is taken from the mill.

11. In the preparation of a slip for vitreous enamels and glazes from acid resisting glass mill liquor containing approximately 50% silica besides alkaline substances and finely-divided glass particles, the step which consists in decomposing titanium sulphate in said liquor to neutralize said alkaline substances and precipitate titanium hydrate whereby said glass particles are floated therein.

CHARLES J. KINZIE.